US012687746B2

(12) United States Patent
 Yamamoto

(10) Patent No.: US 12,687,746 B2
(45) Date of Patent: Jul. 21, 2026

(54) LIGHT EMITTING UNIT, LIQUID CRYSTAL MODULE, DISPLAY DEVICE, AND LIGHTING SYSTEM

(71) Applicant: SATURN LICENSING LLC, New York, NY (US)

(72) Inventor: Takeshi Yamamoto, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 18/966,278

(22) Filed: Dec. 3, 2024

(65) Prior Publication Data

US 2025/0155633 A1 May 15, 2025

Related U.S. Application Data

(63) Continuation of application No. 18/214,730, filed on Jun. 27, 2023, now Pat. No. 12,189,173, which is a
(Continued)

(30) Foreign Application Priority Data

May 25, 2016 (JP) ................................ 2016-104062

(51) Int. Cl.
 *G02F 1/1333* (2006.01)
 *F21V 8/00* (2006.01)
 *G02F 1/13357* (2006.01)

(52) U.S. Cl.
 CPC ..... *G02F 1/133317* (2021.01); *G02B 6/0088* (2013.01); *G02F 1/133308* (2013.01);
(Continued)

(58) Field of Classification Search
 CPC ............. G02B 6/0055; G02F 1/133308; G02F 1/133317; G02F 1/1332; G02F 1/133615
 See application file for complete search history.

(56) References Cited

U.S. PATENT DOCUMENTS 7,764,335 B2 7/2010 Tanaka et al.
8,421,950 B2 4/2013 Kim et al.
(Continued)

FOREIGN PATENT DOCUMENTS

CN 104267524 1/2015
CN 104819440 8/2015
(Continued)

OTHER PUBLICATIONS

International Search Report corresponding to PCT/JP2017/011629, dated Jun. 13, 2017, 4 pgs.

*Primary Examiner* — Keith G. Delahoussaye
(74) *Attorney, Agent, or Firm* — Richard LaPeruta

(57) ABSTRACT

A display device includes a liquid crystal module (10, 20, 30) including a display panel (10) and a light emitting unit (20) that illuminates the display panel (10). The light emitting unit (20) includes a support substrate (24) that is disposed to face the display panel (10), a light guide member (21) that is provided between the display panel (10) and the support substrate (24), and has a first end surface (213) and a second end surface (214), a light source (22) that is disposed to face the first end surface (213), and a holding member (25) that is provided between the display panel (10) and the support substrate (24) along an outer edge of the support substrate (24), and has a facing surface joined to the second end surface (214). This display device has a structure suitable for a thin profile.

20 Claims, 9 Drawing Sheets

Related U.S. Application Data continuation of application No. 17/883,657, filed on Aug. 9, 2022, now Pat. No. 11,726,255, which is a continuation of application No. 16/096,067, filed as application No. PCT/JP2017/011629 on Mar. 23, 2017, now Pat. No. 11,460,630.

(52) U.S. Cl.
CPC .... *G02F 1/13332* (2021.01); *G02F 1/133608* (2013.01); *G02F 1/133615* (2013.01)

(56) References Cited

U.S. PATENT DOCUMENTS

| | | | |
|---|---|---|---|
| 9,436,309 | B2 | 9/2016 | Jeong |
| 9,618,781 | B2 | 4/2017 | Jang et al. |
| 9,955,592 | B2 | 4/2018 | Yamamoto |
| 10,036,848 | B2 | 7/2018 | Ikuta et al. |
| 11,422,396 | B2 | 8/2022 | Baek et al. |
| 2005/0088583 | A1 | 4/2005 | Ohkawa et al. |
| 2007/0133222 | A1 | 6/2007 | Watanabe et al. |
| 2009/0207560 | A1 | 8/2009 | Lee |
| 2011/0051033 | A1* | 3/2011 | Shimizu ............ G02F 1/133308 |
| | | | 349/58 |
| 2011/0141391 | A1 | 6/2011 | Kim et al. |
| 2011/0193800 | A1 | 8/2011 | Son et al. |
| 2012/0206940 | A1 | 8/2012 | Han et al. |
| 2012/0250354 | A1 | 10/2012 | Yoshida |
| 2013/0070475 | A1* | 3/2013 | Youk ................ G02F 1/133615 |
| | | | 362/602 |
| 2013/0077343 | A1 | 3/2013 | Kim et al. |
| 2013/0308074 | A1 | 11/2013 | Park et al. |
| 2014/0092631 | A1 | 4/2014 | Fujii et al. |
| 2014/0375899 | A1* | 12/2014 | Ozeki ..................... H04N 9/30 |
| | | | 348/791 |
| 2015/0055026 | A1* | 2/2015 | Ikuta ................... G02B 6/0088 |
| | | | 348/791 |
| 2015/0168767 | A1 | 6/2015 | Yonemura |
| 2015/0234116 | A1* | 8/2015 | Azuma ............ G02F 1/133608 |
| | | | 362/97.1 |
| 2015/0282334 | A1 | 10/2015 | Yamamoto |
| 2015/0286092 | A1 | 10/2015 | Ejiri |
| 2015/0309355 | A1* | 10/2015 | Murakami ........ G02F 1/133603 |
| | | | 349/58 |
| 2016/0245988 | A1* | 8/2016 | Sugimoto ............ G02B 6/0055 |
| 2017/0205570 | A1 | 7/2017 | Sugimoto et al. |
| 2019/0154908 | A1 | 5/2019 | Yabuuchi |

FOREIGN PATENT DOCUMENTS

| | | |
|---|---|---|
| CN | 104914624 | 9/2015 |
| CN | 105044981 | 11/2015 |
| CN | 103383500 | 12/2015 |
| CN | 105278030 | 1/2016 |
| CN | 105384337 | 3/2016 |
| CN | 205193310 U | 4/2016 |
| CN | 105549265 | 5/2016 |
| CN | 103576359 A | 11/2016 |
| JP | 08-190085 | 7/1996 |
| JP | 2006108116 | 4/2006 |
| JP | 2007072018 | 3/2007 |
| JP | 2011082176 | 4/2011 |
| JP | 2012242805 | 12/2012 |
| JP | 2013008016 | 1/2013 |
| JP | 2014095792 | 5/2014 |
| JP | 2015176752 | 10/2015 |
| JP | 2016024465 | 2/2016 |
| KR | 20150050612 | 5/2015 |
| WO | 2015145557 | 10/2015 |
| WO | 2016031394 | 3/2016 |
| WO | 2016031397 | 3/2016 |
| WO | 2016046973 | 3/2016 |

* cited by examiner

[ FIG. 1A ]
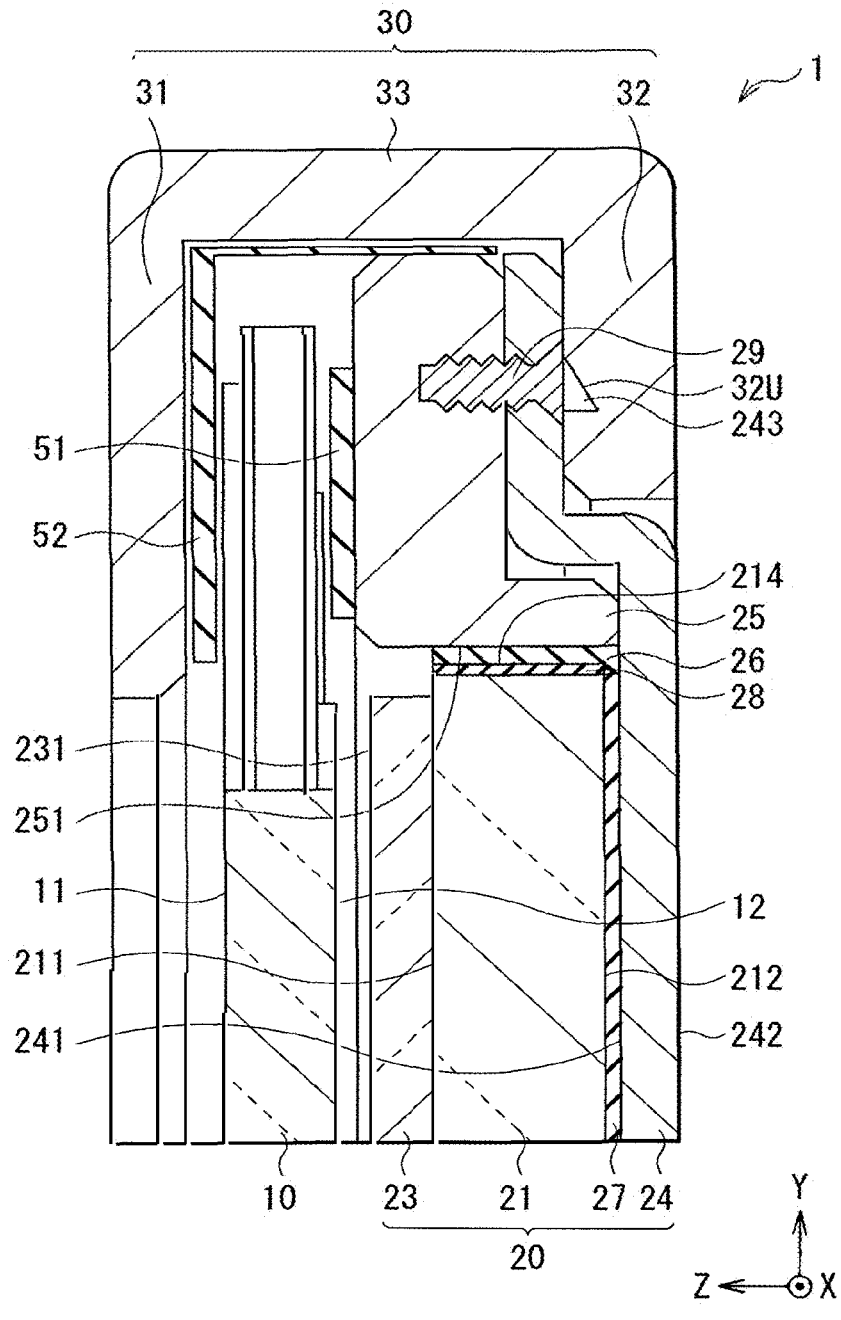

[ FIG. 1B ]
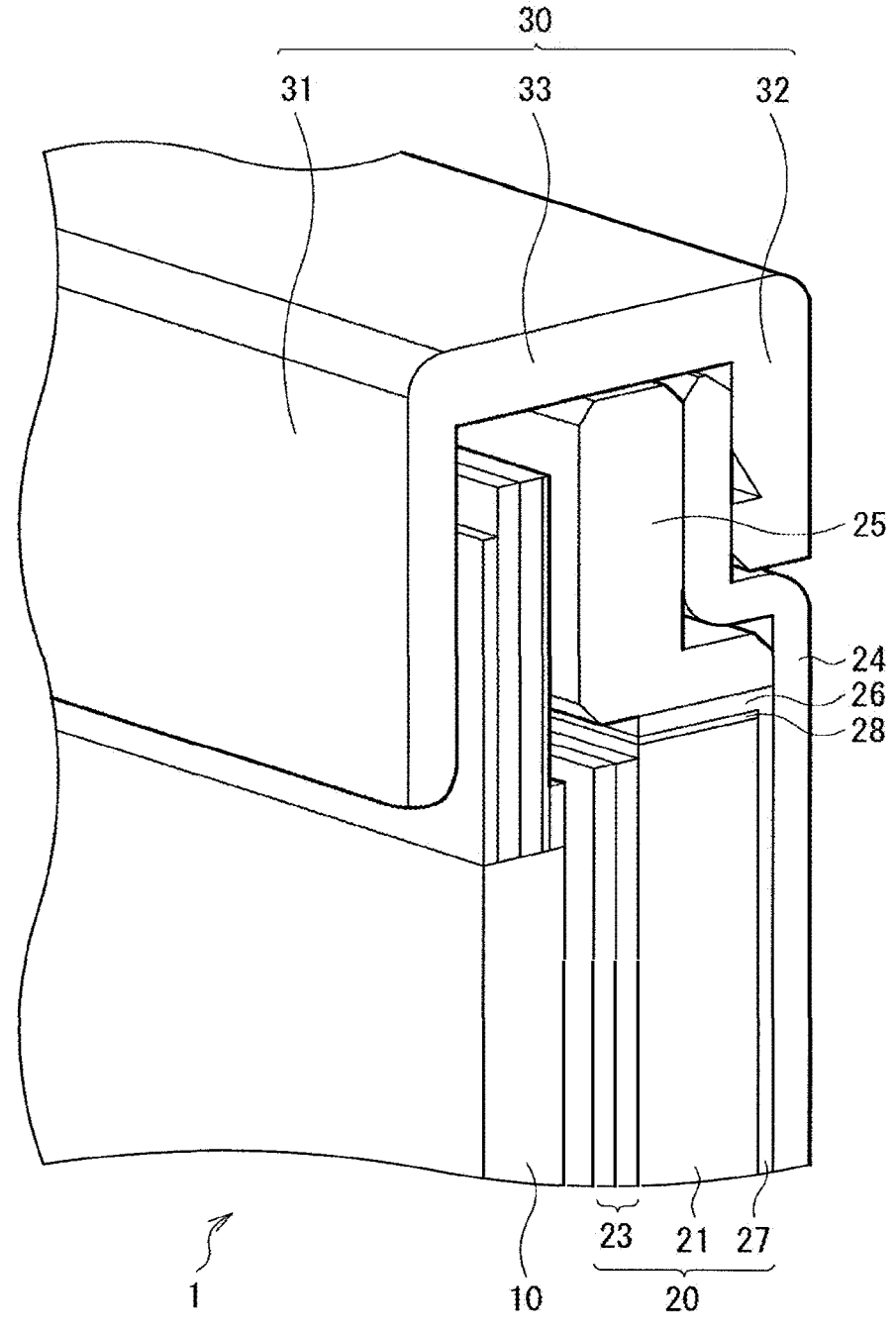

[FIG. 2]
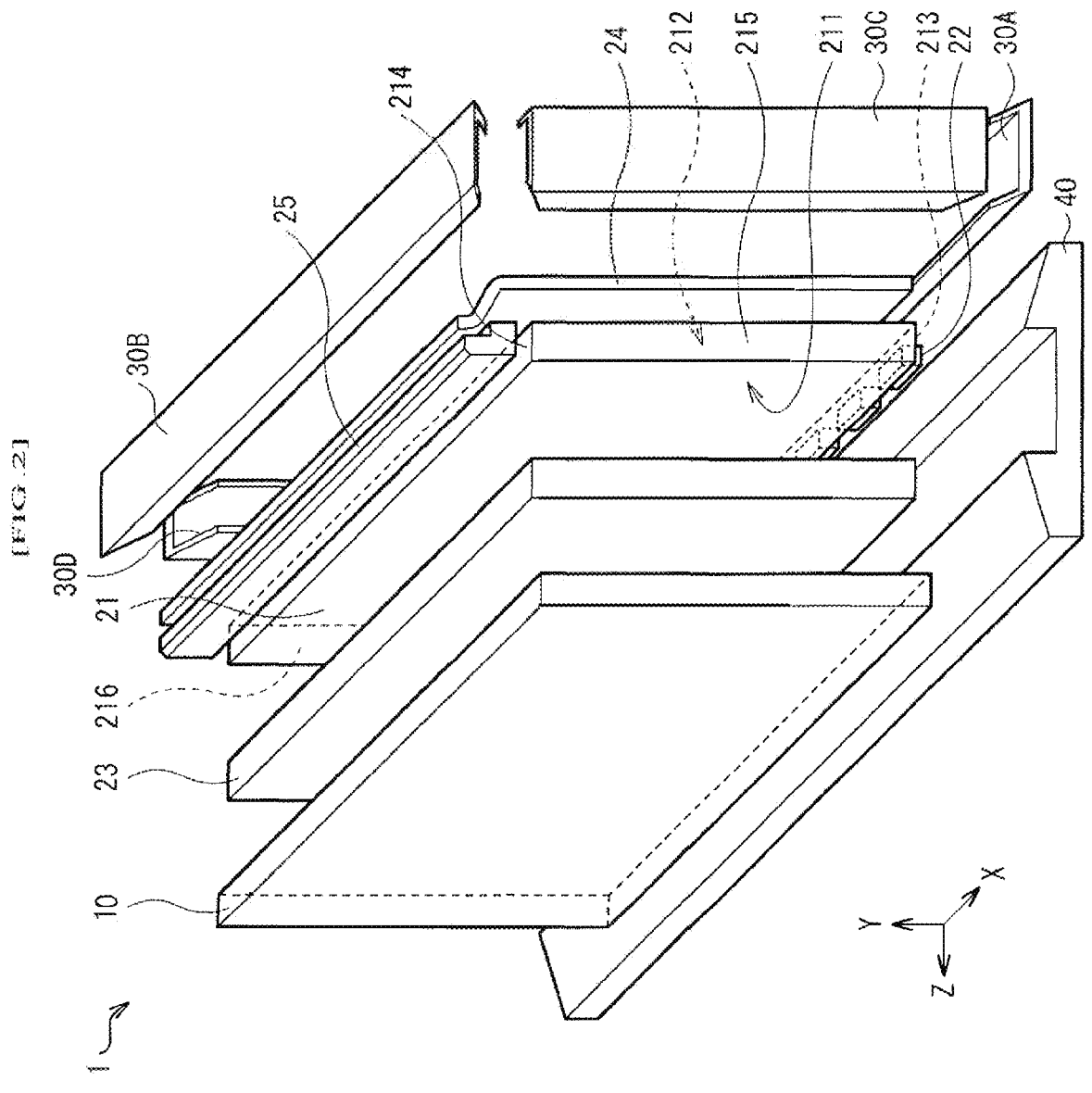

[ FIG. 3A ]
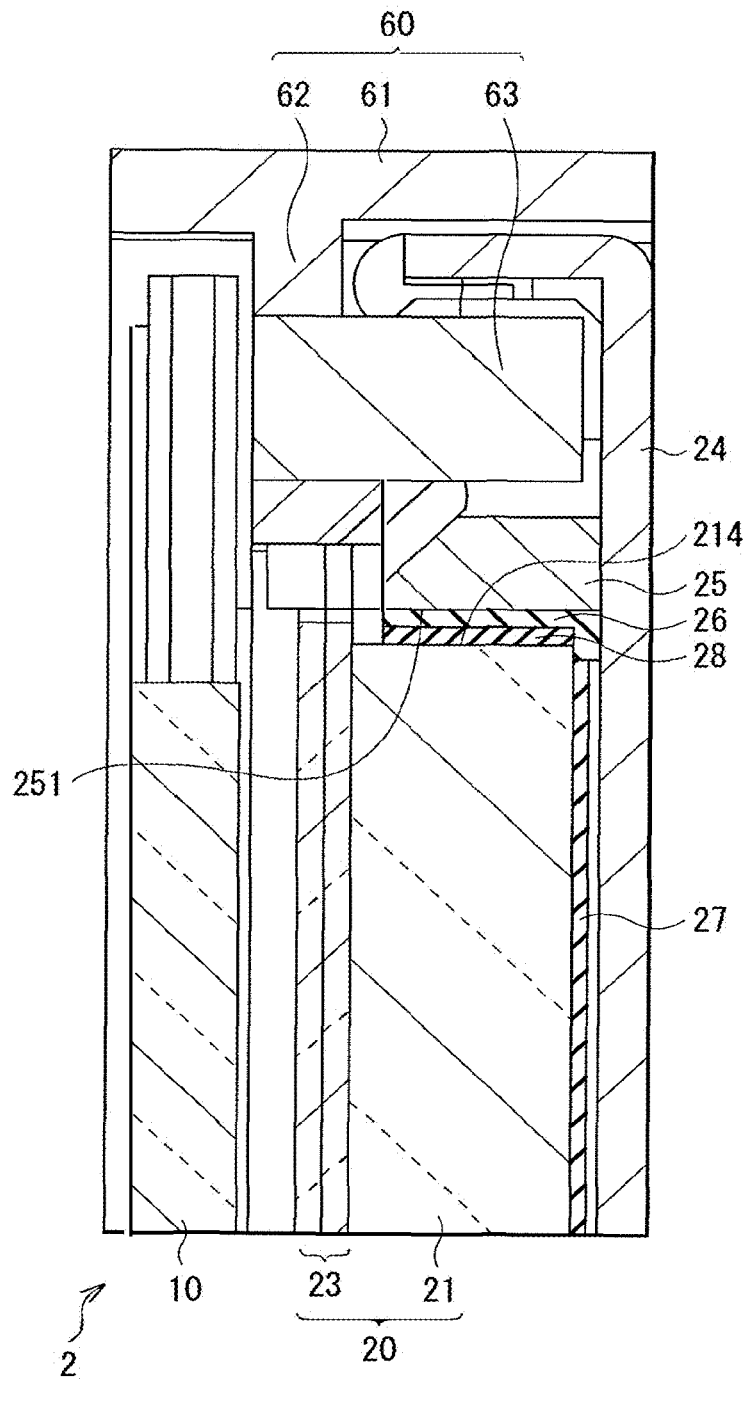

[ FIG. 3B ]
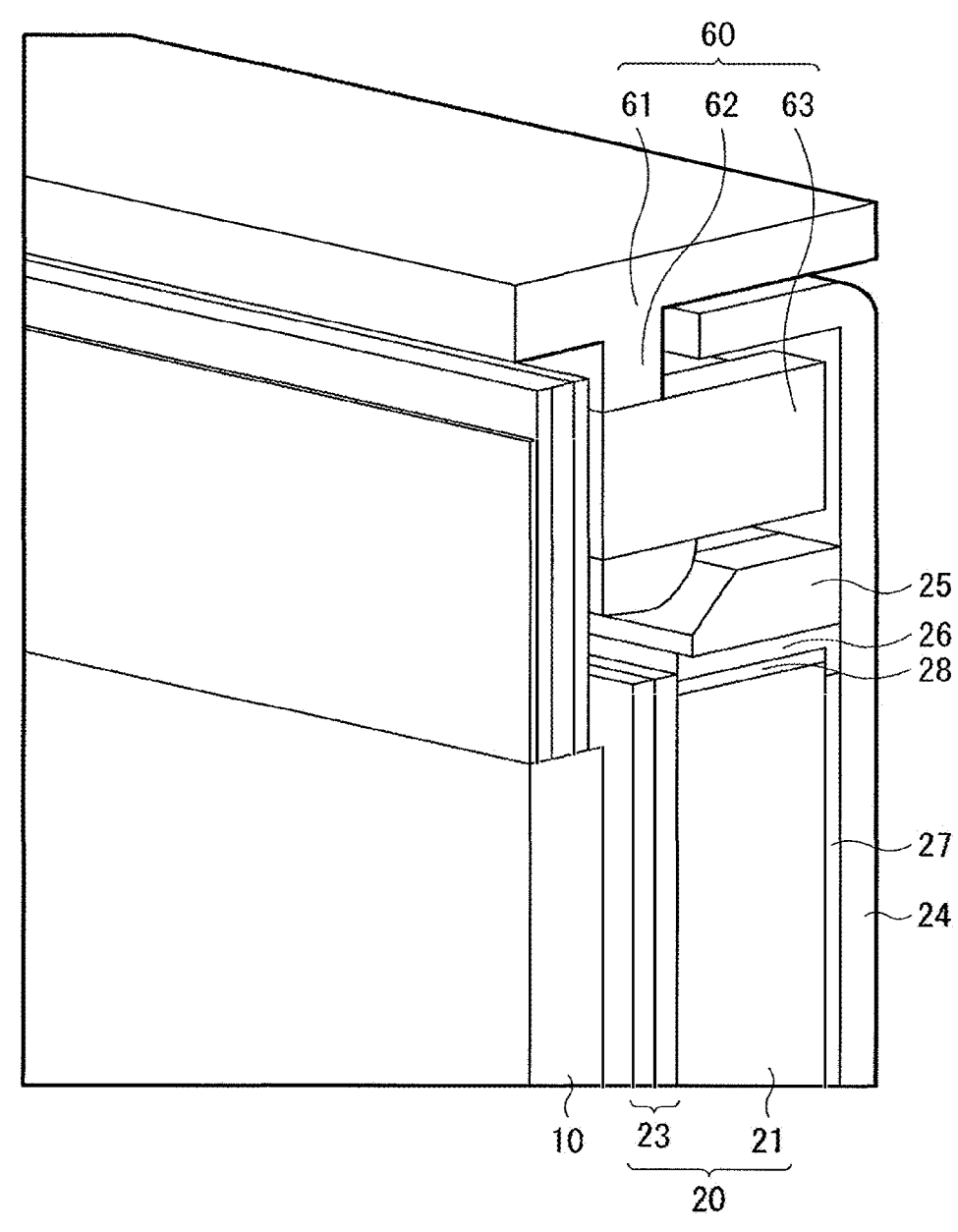

[FIG. 4A]
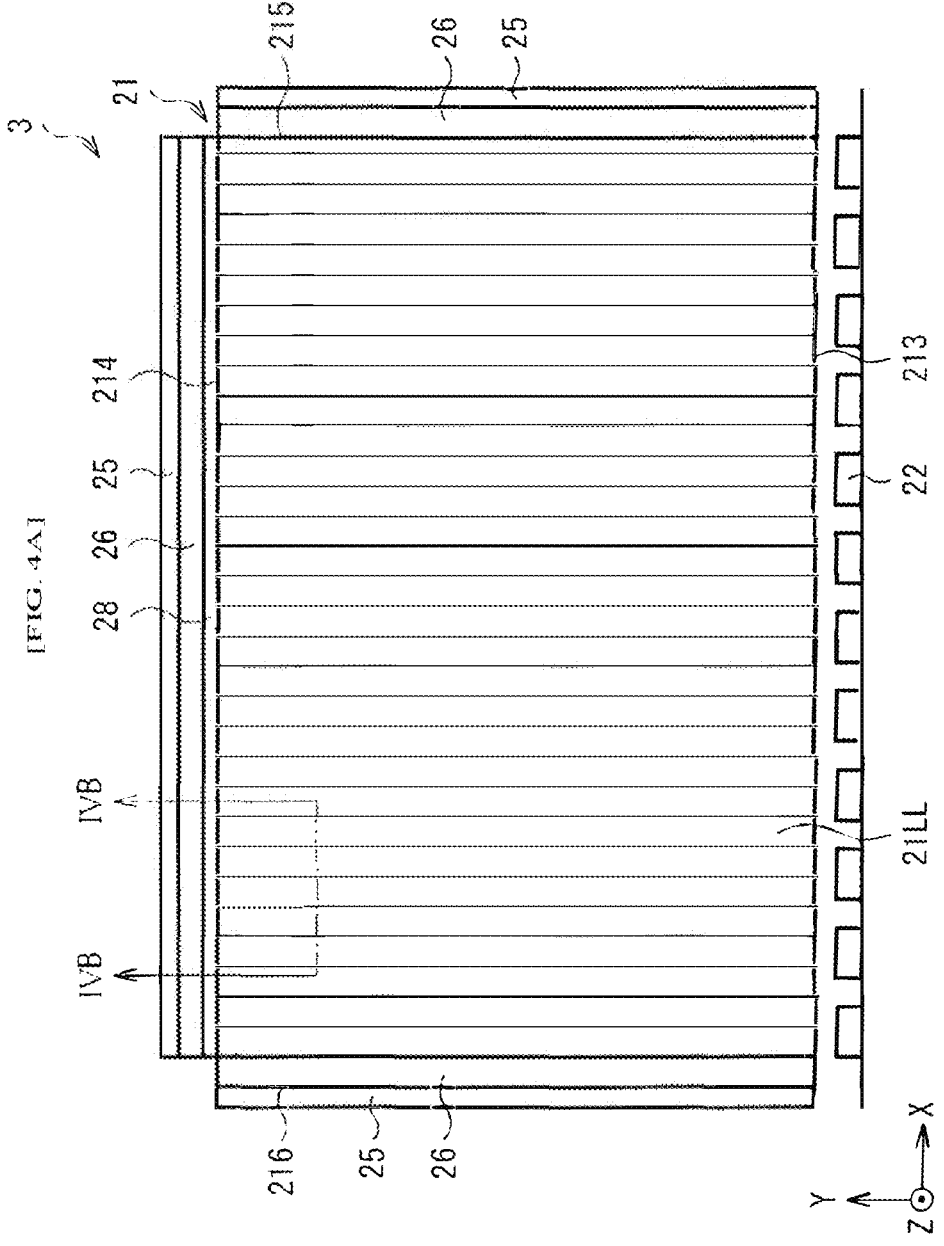

[ FIG. 4B ]
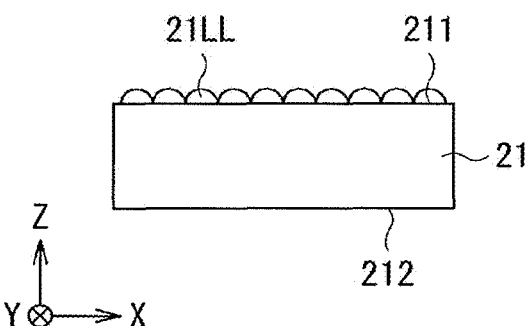

[FIG. 5]
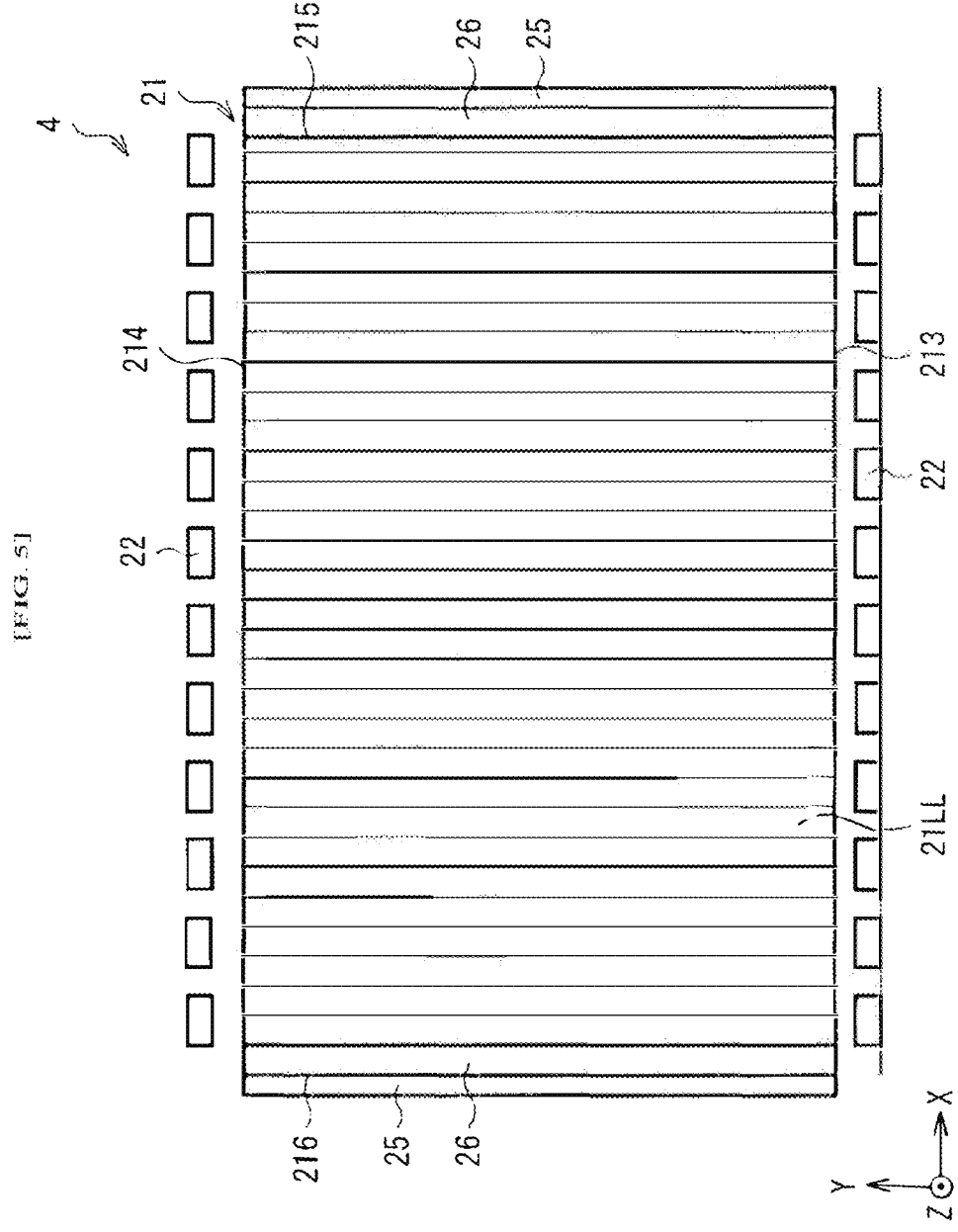

[ FIG. 6 ]
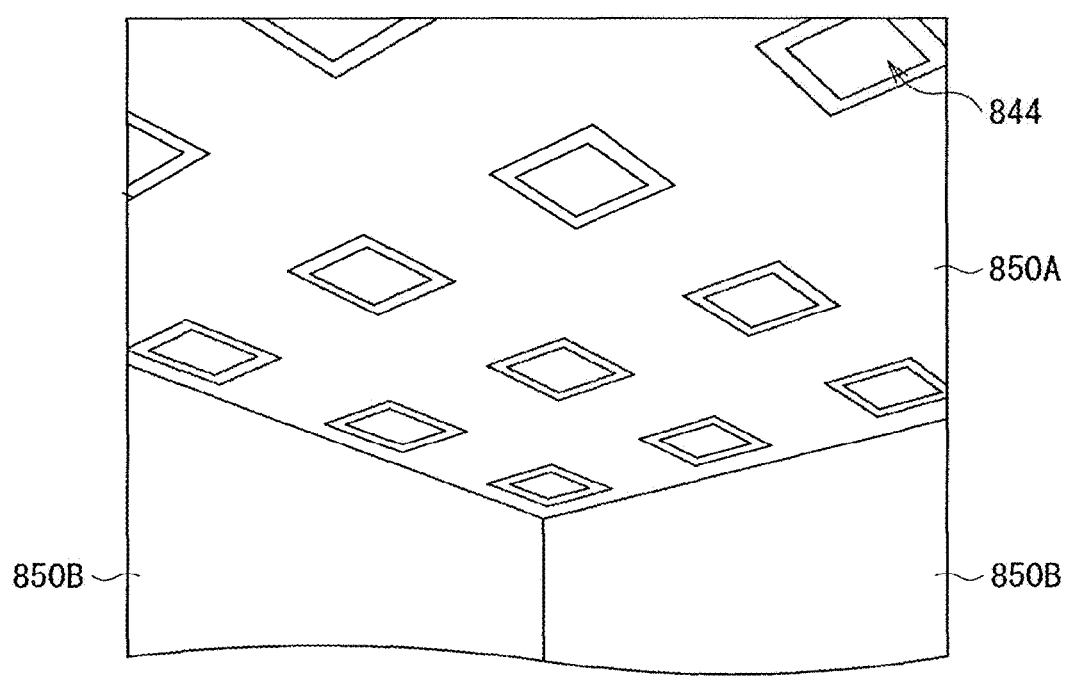

LIGHT EMITTING UNIT, LIQUID CRYSTAL MODULE, DISPLAY DEVICE, AND LIGHTING SYSTEM

TECHNICAL FIELD

The disclosure relates to a light emitting unit that is a surface light source, and a liquid crystal module, a display device, and a lighting system each including the light emitting unit.

BACKGROUND ART

There has already been proposed a display device in which a display panel including liquid crystal elements and a backlight as a light source are stacked together (for example, see PTLs 1 to 3).

CITATION LIST

Patent Literature

PTL 1: Japanese Unexamined Patent Application Publication No. 2011-82176
PTL 2: Japanese Unexamined Patent Application Publication No. 2012-242805
PTL 3: Japanese Unexamined Patent Application Publication No. 2016-24465

SUMMARY OF THE INVENTION

Nowadays, demands for a display device having a thin profile are growing even stronger. Therefore, it is desirable to provide a display device having a structure suitable for a thin profile, and a light emitting unit and a liquid crystal module that are suitable for the display device.

A display device as an embodiment of the disclosure includes a liquid crystal module including a display panel and a light emitting unit that illuminates the display panel. This light emitting unit includes a support substrate that is disposed to face the display panel, a light guide member that is provided between the display panel and the support substrate, and has a first end surface and a second end surface, a light source that is disposed to face the first end surface, and a holding member that is provided between the display panel and the support substrate along an outer edge of the support substrate, and has a facing surface joined to the second end surface.

A light emitting unit as an embodiment of the disclosure includes a support substrate, a light guide member that is disposed to face the support substrate, and has a first end surface and a second end surface, a light source that is disposed to face the first end surface, and a holding member that is provided along an outer edge of the support substrate, and has a facing surface joined to the second end surface.

A lighting system of the disclosure includes the above-described light emitting unit. Furthermore, the liquid crystal module of the disclosure includes a display panel and the above-described light emitting unit illuminating the display panel.

In the light emitting unit, the liquid crystal module, the display device, and the lighting system as the embodiments of the disclosure, the holding member provided along the outer edge of the support substrate holds the light guide member with its facing surface joined to the second end surface of the light guide member. Accordingly, the thickness of the holding member is reduced compared with a case where the holding member has a structure that holds an end of the light guide member in a thickness direction, for example.

According to the light emitting unit, the liquid crystal module, the display device, and the lighting system as the embodiments of the disclosure, it is possible to achieve a structure suitable for a thin profile. It is to be noted that effects of the disclosure are not limited to the effects described above, and may be any of the effects described below.

BRIEF DESCRIPTION OF DRAWINGS

FIG. 1A is a cross-sectional view illustrating an internal configuration example of a main part of a display device according to a first embodiment of the disclosure.

FIG. 1B is a partially cut-away perspective view illustrating the internal configuration example of the main part of the display device according to the first embodiment of the disclosure.

FIG. 2 is an exploded perspective view illustrating an entire configuration example of the display device illustrated in FIG. 1.

FIG. 3A is a cross-sectional view illustrating an internal configuration example of a main part of a display device according to a second embodiment of the disclosure.

FIG. 3B is a partially cut-away perspective view illustrating the internal configuration example of the main part of the display device according to the second embodiment of the disclosure.

FIG. 4A is a plan view illustrating a configuration example of a main part of a display device as a first modification example of the disclosure.

FIG. 4B is a cross-sectional view of the main part of the display device as the first modification example illustrated in FIG. 4A.

FIG. 5 is a plan view illustrating a configuration example of a main part of a display device as a second modification example of the disclosure.

FIG. 6 is a perspective view illustrating an appearance of a lighting system including the light emitting unit of the disclosure.

MODES FOR CARRYING OUT THE INVENTION

In the following, some embodiments of the disclosure are described in detail with reference to the drawings. It is to be noted that description is made in the following order.

1. First Embodiment
An example of a display device in which a bezel takes hold of a display panel and a light emitting unit.
2. Second Embodiment
An example of a display device in which a portion of the bezel is held between the display panel and the light emitting unit.
3. Modification Examples
4. Example of Application to Lighting System

1. First Embodiment

[Configuration of Display Device 1]
FIG. 1A illustrates a cross-sectional configuration example of a main part of a display device 1 as a first embodiment of the disclosure; FIG. 1B is a partially cut-away perspective view illustrating an internal configuration example of the display device 1. Furthermore, FIG. 2 illustrates an entire configuration of the display device 1. The display device 1 is a liquid crystal display device used, for example, as a television apparatus.

The display device 1 includes a display panel 10, a light emitting unit 20, a bezel 30, and a stand 40. In the display device 1, the display panel 10 and the light emitting unit 20 are disposed to face each other, and the bezel 30 covers their peripheries. Here, for example, the display panel 10, the light emitting unit 20, and the bezel 30 are a specific example corresponding to a liquid crystal module of the disclosure. As illustrated in FIG. 2, the stand 40 is for standing a display section that the display panel 10, the light emitting unit 20, and the bezel 30 are integrated thereinto on the floor. The stand 40 mounts thereon, for example, a drive circuit that drives a light source 22 (to be described later), a speaker, etc. It is to be noted that in this specification, a horizontal direction of the display panel 10 is referred to as an X-axis direction; a height direction of the display panel 10 is referred to as a Y-axis direction; and a direction in which the display panel 10 and the light emitting unit 20 are stacked is referred to as a Z-axis direction.

The light emitting unit 20 is a so-called backlight unit that provides illumination light for the display panel 10. The light emitting unit 20 includes a light guide plate 21, a plurality of the light sources 22 (FIG. 2), an optical sheet group 23, a support substrate 24, a holding member 25, an adhesion layer 26, a reflection sheet 27, and an optical film 28.

The support substrate 24 is a so-called back chassis disposed to face a back surface 12 (to be described later) of the display panel 10, and includes, as a main constituent material, a metal material having high rigidity, such as stainless-steel plate or color steel plate. The support substrate 24 has a front surface 241 that faces the back surface 12 and a back surface 242 on the side opposite to the front surface 241. A projecting claw portion 243 is provided near an outer edge of the back surface 242.

The light guide plate 21 is a flat plate member that is provided between the display panel 10 and the support substrate 24, and includes, for example, front and back surfaces 211 and 212 that face each other and end surfaces 213 to 216 that connect the front and back surfaces 211 and 212. It is to be noted that in the present embodiment, a plane on which the front and back surfaces 211 and 212 spread is referred to as an XY plane; a plane on which the end surfaces 213 and 214 spread is referred to as an XZ plane; and a plane on which the end surfaces 215 and 216 that are a pair of side surfaces spread is referred to as a YZ plane. Here, the end surface 213 that is an undersurface serves as a light incident surface. The light guide plate 21 is a member that guides light from the light sources 22 to the display panel 10. Specifically, the light guide plate 21 serves to propagate, inside the light guide plate 21, light that has been emitted from the light sources 22 and entered the end surface 213 that is a light incident surface, and output through the front surface 211 that is a light emitting surface toward the display panel 10. As a constituent material of the light guide plate 21, a high-transparent material is suitable; such high-transparent materials include, for example, glass as well as acrylic resin, such as polymethyl methacrylate (PMMA), and other resin materials, such as polycarbonate (PC) and cyclic polyolefin (COP). Of these constituent materials, glass is particularly preferable. This is because glass is small in dimensional change in accordance with a temperature change (i.e., coefficient of cubical expansion) and has high rigidity, compared with resin materials.

It is to be noted that in the present embodiment, it is configured to let light enter only through the end surface 213 that is an undersurface; however, it may be configured to let light enter, for example, through the end surface 214 that is a top surface. Alternatively, it may be configured to let light enter through the end surfaces 215 and 216 that are side surfaces.

The end surfaces 214 to 216 are mirror surfaces processed by polishing or the like, and are covered with the optical film 28. The optical film 28 serves, for example, as a light reflecting layer, and is obtained by applying reflective ink or the like onto the end surfaces 214 to 216 by printing, coating, or vapor deposition. Furthermore, the optical film 28 may serve as a light absorbing layer. In that case, the light absorbing layer may be formed, for example, by printing, coating, or vapor deposition of a light absorbing material, such as black resin. Providing such an optical film 28 makes it possible to prevent light that has been emitted from the light sources 22 and reached the end surfaces 214 to 216 from leaking out of the light guide plate 21 through the end surfaces 214 to 216 or from being scattered on the end surfaces 214 to 216. However, from a perspective of luminous efficiency, the optical film 28 is desirably a light reflecting layer rather than a light absorbing layer but.

It is to be noted that although the optical film 28 and the adhesion layer 26 are provided as separate components in the present embodiment, an adhesive tape that serves as both the optical film 28 and the adhesion layer 26 may be provided instead.

The plurality of light sources 22 are all a point light source and each include a light emitting diode (LED) that emits, for example, white light. The plurality of light sources 22 face the end surface 213 as a light incident surface of the light guide plate 21, and are disposed to align in the X-axis direction. One or more light sources 22 mounted on one circuit board may configure one light source unit.

The reflection sheet 27 is provided to face the back surface 212 of the light guide plate 21. The reflection sheet 27 serves to reflect light that has been emitted from the light sources 22 and leaked through the back surface 212 of the light guide plate 21 and return the light back to the light guide plate 21. This makes it possible to increase luminous efficiency of the light emitting unit 20. A constituent material of the reflection sheet 27 is, for example, polycarbonate resin, acrylic resin such as polymethyl methacrylate resin (PMMA), polyester resin such as polyethylene terephthalate, amorphous copolyester resin such as a copolymer of methyl methacrylate and styrene (MS), polystyrene resin, or polyvinylchloride resin.

The holding member 25 is provided between the display panel 10 and the support substrate 24 along an outer edge of the support substrate 24. The holding member 25 has a facing surface 251 joined, for example, to the end surface 214 of the light guide plate 21. The facing surface 251 of the holding member 25 and the end surface 214 of the light guide plate 21 are joined through the adhesion layer 26. A constituent material of the adhesion layer 26 is, for example, an adhesive having sufficient adhesive force and elasticity, specifically, an adhesive such as acrylic resin, urethane resin, epoxy resin, vinyl chloride resin, or modified silicone resin. Furthermore, the holding member 25 and the support substrate 24 are fixed to each other, for example, with a screw 29. The holding member 25 may include a metal material such as aluminum or stainless steel. Furthermore, the holding member 25 is provided on, of a region on the support substrate 24, a peripheral region other than a central region that the light guide plate 21 occupies. Moreover, the holding member 25 holds the display panel 10 through a buffer 51. It is to be noted that FIG. 2 illustrates an example where the holding member 25 is provided only in a position facing the end surface 214 of the light guide plate 21; however, other holding members 25 may also be provided, for example, in positions facing the end surfaces 215 and 216.

The optical sheet group 23 exerts various optical effects on light emitted from the light sources 22 to the display panel 10 through the light guide plate 21. The optical sheet group 23 is a laminate of multiple sheet members, such as a diffuser panel, a diffusion sheet, a lens film, and a polarization separation sheet.

The display panel 10 is a transmissive liquid crystal display panel that displays an image such as a moving image or a still image, and is provided with a liquid crystal layer between a TFT substrate and a color filter substrate, for example. The display panel 10 has the back surface 12 where light from the light emitting unit 20 enters and a front surface 11 through which the light exits. The display panel 10 may further include a polarizing plate or the like.

The bezel 30 is a frame member for protecting the peripheries of the display panel 10 and the light emitting unit 20 and improving aesthetics. As illustrated in FIG. 2, the bezel 30 is configured to be able to be divided into, for example, four members 30A to 30D. The members 30A to 30D are provided to face the end surfaces 213 to 216 of the light guide plate 21, respectively. Note that, the holding member 25 is provided between the member 30B and the end surface 214 of the light guide plate 21. Furthermore, the holding members 25 may be provided between the member 30C and the end surface 215 and between the member 30D and the end surface 216.

As illustrated in FIGS. 1A and 1B, the members 30A to 30D each have an anterior portion 31 and a posterior portion 32 that are provided to hold the peripheries of the display panel 10 and the light emitting unit 20 between the anterior portion 31 and the posterior portion 32, for example, in a thickness direction (the Z-axis direction), and a lateral portion 33 provided to connect the anterior portion 31 and the posterior portion 32. Each of the members 30A to 30D may have the anterior portion 31, the posterior portion 32, and the lateral portion 33 that are all integrally molded together. Alternatively, each of the members 30A to 30D may have the anterior portion 31, the posterior portion 32, and the lateral portion 33 that are individually molded and joined together by screwing or adhesive bonding, for example. Furthermore, the posterior portion 32 may have a depressed portion 32U provided to be engageable with the claw portion 243 of the support substrate 24. In that case, the depressed portion 32U is engaged with the claw portion 243, thereby the bezel 30 is held at a predetermined position on the support substrate 24. Moreover, the bezel 30 may be screwed to the support substrate 24 or be held on the support substrate 24 by magnetic force. Furthermore, a light shielding sheet 52 for blocking light leaking through the periphery of the light emitting unit 20 may be provided between a front surface of the display panel 10 and the anterior portion 31 of the bezel 30. The light shielding sheet 52 may have elasticity so as to also serve as a buffer for stably holding the display panel 10 and the bezel 30.

[Workings and Effects of Display Device 1]

In this way, in the display device 1 of the present embodiment, the holding member 25 held between the display panel 10 and the support substrate 24 holds the light guide plate 21 with its facing surface 251 joined to the end surface 214 of the light guide plate 21. Accordingly, the thickness of the holding member 25 is reduced compared with a case where the holding member 25 has a structure that holds an end of the light guide plate 21 in the thickness direction (the Z-axis direction), for example. Therefore, according to the display device 1, it is possible to achieve a structure suitable for a thin profile.

Furthermore, in the display device 1, the light guide plate 21 includes a glass material. This enables a thinner profile. Since glass materials have higher rigidity than resin materials, the light guide plate 21 including a glass material serves as a structure. That is, by using not a resin material but a glass material, distortion and deflection of the light guide plate 21 are suppressed, and a space between the display panel 10 and the light emitting unit 20 (for example, a space between the back surface 12 and a front surface 231 of the optical sheet group 23) is able to be narrowed. As a result, the display device 1 having a thin profile as a whole is achieved.

Moreover, as the light guide plate 21 includes a glass material, it is advantageous to a so-called slim bezel. Since glass materials have a lower coefficient of thermal expansion than resin materials, it is possible to suppress expansion and contraction of the light guide plate 21 including a glass material in accordance with a temperature change. Accordingly, in FIG. 1A, for example, a gap between an inner surface of the lateral portion 33 of the bezel 30 and the holding member 25 is able to be reduced. As a result, a dimension of the bezel 30 in the Y-axis direction is able to be reduced, and it is possible to achieve the slim bezel display device 1.

Furthermore, in the display device 1, the holding member 25 and the support substrate 24 are fastened with the screw 29, and the bezel 30 is engaged with the claw portion 243 of the support substrate 24 and thereby held on the support substrate 24. This ensures high dismantlability.

Moreover, in the display device 1, the light guide plate 21 includes a glass material, and the support substrate 24 includes a metal material. Therefore, it is possible to achieve the light emitting unit 20 having high rigidity.

2. Second Embodiment

[Configuration of Display Device 2]

A display device 2 as a second embodiment of the disclosure is described with reference to mainly FIGS. 3A and 3B. FIG. 3A illustrates a cross-sectional configuration example of a main part of the display device 2. FIG. 3B is a partially cut-away perspective view illustrating an internal configuration example of the display device 2. The display device 2 is also a liquid crystal display device used, for example, as a television apparatus. The display device 2 has the same structure as the display device 1 of the foregoing first embodiment, except that the display device 2 is provided with a bezel 60 instead of the bezel 30.

In the display device 1, the bezel 30 has the anterior portion 31 and the posterior portion 32 that are provided to hold the display panel 10 and the light emitting unit 20 in the thickness direction. In contrast, in the display device 2, the bezel 60 has a portion (a second portion 62) held between the display panel 10 and the light emitting unit 20 in the thickness direction.

Specifically, the bezel 60 has a first portion 61 that covers both end surfaces of the display panel 10 and the light emitting unit 20, the second portion 62 standing out from the first portion 61, and a third portion 63 standing out from the second portion 62.

Here, the third portion 63 of the bezel 60 and the support substrate 24 are fixed, for example, with a screw. Alternatively, the third portion 63 may include a permanent magnet so that the third portion 63 magnetically attracts the support substrate 24. Furthermore, due to the fixing of the third portion 63 of the bezel 60 and the support substrate 24, the holding member 25 is held between them.

Also in this display device 2, the holding member 25 holds the light guide plate 21 with its facing surface 251 joined to the end surface 214 of the light guide plate 21. Accordingly, it is possible to expect effects similar to the display device 1 in the foregoing first embodiment.

3. Modification Examples

In the foregoing embodiments, the optical film 28 is provided on all of the end surfaces 214 to 216 other than the end surface 213 of the light guide plate 21. However, the disclosure is not limited to such a configuration. For example, in a display device 3 as a first modification example illustrated in FIGS. 4A and 4B, for example, a lenticular lens 21LL with a plurality of minute convex portions (cylindrical lenses) that extend in the Y-axis direction and aligned in the X-axis direction is provided on the front surface 211. The presence of such a lenticular lens 21LL allows for improvement of rectilinear propagation of light propagating in the light guide plate 21. In this case, light that has been emitted from the light sources 22 and entered the end surface 213 goes straight substantially in a +Y direction, and its spread in the X-axis direction is suppressed. Accordingly, in the display device 3, light components that reach the end surfaces 215 and 216 are reduced sufficiently. Therefore, it is only necessary to form the optical film 28 only on the end surface 214 facing the end surface 213, and it is not necessary to provide the optical film 28 on the end surfaces 215 and 216.

Furthermore, although the plurality of light sources 22 are disposed to face the end surface 213 located at the bottom of the light guide plate 21 in the foregoing embodiments, the disclosure is not limited to this. For example, like a display device 4 as a second modification example illustrated in FIG. 5, for example, the light sources 22 may be disposed in both positions facing the end surfaces 213 and 214 of the light guide plate 21. Also in this case, the lenticular lens 21LL is provided on the front surface 211 of the light guide plate 21 to enhance the rectilinear propagation of light incident on the light guide plate 21 in the Y-axis direction, so that the optical film 28 need not be provided on the end surfaces 215 and 216.

Moreover, as a scattering section that scatters light propagating in the light guide plate 21 to uniformize the light, a scattering structure may be formed, for example, by discretely printing a scattering agent on the back surface 212 of the light guide plate 21. It is to be noted that such a scattering structure may be formed by providing a part including a filler, instead of printing a pattern with the scattering agent, or may be formed by roughening part of the surface. This configuration makes it possible to further homogenize an emission luminance distribution of the light emitting unit 20.

4. Example of Application to Lighting System

FIG. 6 illustrates an appearance of an indoor lighting system to which the light emitting unit 20 of any foregoing embodiment is applied. This lighting system has, for example, an illumination part 844 including the light emitting unit 20 according to the foregoing embodiment. An appropriate number of the lights 844 are disposed at appropriate intervals on a ceiling 850A of a building. It is to be noted that the illumination part 844 is able to be installed not only on the ceiling 850A but also on any places, such as a wall 850B and a floor (not illustrated), depending on the intended use.

In this lighting system, lighting is performed with light from the light emitting unit 20. This lighting system includes the light emitting unit 20 having the thin profile, a slim bezel, and high rigidity, and therefore is able to be installed in a narrow space.

Although the description has been made by referring to the embodiments and the modification examples as mentioned above, the disclosure is not limited to the foregoing embodiments, etc. and may be modified in a variety of ways. For example, the arrangement positions and shapes of the holding member, the bezel, the support substrate, etc. described in the foregoing embodiments, etc. are mere examples, and are not limited to those described above.

Furthermore, the dimensions, dimensional ratio, and shape of each component illustrated in the drawings are mere examples, and the disclosure is not limited to them.

Moreover, although LEDs are used as the light sources 22 in the foregoing embodiments, etc., semiconductor lasers or the like may be used as the light sources 22.

Furthermore, for example, the display devices described in the foregoing embodiments, etc. are not limited to a case where each display device includes all the components described above, and may be devoid of some of the components, and may further include other components.

For example, the display devices 1 and 2 described in the foregoing embodiments, etc. may further include a rear cover disposed on the side, of the support substrate 24 of the light emitting unit 20, opposite to the display panel 10. The rear cover includes, for example, polystyrene (PS) or a mixed material of polystyrene and polyphenylene ether (PPE). The display devices 1 and 2 may further include another decorating member. Furthermore, the support substrate 24 may include aluminum. Moreover, a circuit board including a drive circuit that drives the light emitting unit 20, and a tuner may be mounted on the back surface 242 of the support substrate 24.

Furthermore, the display devices 1 and 2 described in the foregoing embodiments, etc. are not limited to a home-use television but also include apparatuses that are used to display information in a wide indoor or outdoor space. Moreover, they have a potential application to various medical equipment (for example, an endoscopic surgical system, an operating room system, a micrographic surgical system, etc.).

It is to be noted that the effects described in this specification are mere examples and are not limited to those described above, and there may be other effects. Furthermore, the disclosure may have the following configurations.

(1)

A display device including a liquid crystal module including a display panel and a
    light emitting unit that illuminates the display panel,
  the light emitting unit including:
    a support substrate that is disposed to face the display
      panel;
    a light guide member that is provided between the
      display panel and the support substrate, and has a
      first end surface and a second end surface;
    a light source that is disposed to face the first end
      surface; and
    a holding member that is provided between the display
      panel and the support substrate along an outer edge of the support substrate, and has a facing surface joined to the second end surface.

(2)

The display device according to (1), in which the second end surface is a mirror surface and is covered with a light reflecting layer or a light absorbing layer.

(3)

The display device according to (1) or (2), in which the second end surface and the facing surface are joined by an adhesive member.

(4)

The display device according to any one of (1) to (3), in which the support substrate includes a metal material,
the light guide member includes a glass material, and
the holding member includes a metal material.

(5)

The display device according to (4), further including a screw with which the holding member and the support substrate are fixed.

(6)

The display device according to any one of (1) to (5), in which the holding member is provided on a peripheral region of the support substrate other than a central region that the light guide member occupies.

(7)

The display device according to any one of (1) to (6), further including a frame member, in which the frame member is screwed to the support substrate, or the frame member is held on the support substrate by magnetic force.

(8)

A light emitting unit including:
a support substrate;
a light guide member that is disposed to face the support substrate, and has a first end surface and a second end surface;
a light source that is disposed to face the first end surface; and
a holding member that is provided along an outer edge of the support substrate, and has a facing surface joined to the second end surface.

(9)

A lighting system including a light emitting unit,
the light emitting unit including:
a support substrate;
a light guide member that is disposed to face the support substrate, and has first and second end surfaces;
a light source disposed to face the first end surface; and
a holding member that is provided along an outer edge of the support substrate, and has a facing surface joined to the second end surface.

(10)

A liquid crystal module including:
a display panel; and
a light emitting unit that illuminates the display panel,
the light emitting unit including:
a support substrate disposed to face the display panel;
a light guide member that is provided between the display panel and the support substrate, and has first and second end surfaces;
a light source disposed to face the first end surface; and
a holding member that is provided between the display panel and the support substrate along an outer edge of the support substrate, and has a facing surface joined to the second end surface.

This application claims the benefit of Japanese Priority Patent Application JP2016-104062 filed with the Japan Patent Office on May 25, 2016, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A display device comprising:
a display panel;
a light emitting unit that faces the display panel and illuminates the display panel;
a unitary structure having a flat portion positioned along an edge of the display panel and oriented perpendicular to a front surface of the display panel and having a second portion that extends inward from the flat portion such that the second portion faces a rear surface of the display panel;
a rear support substrate that faces the rear surface of the display panel;
a light guide member that is part of the light emitting unit and is provided between the display panel and the rear support substrate; and
a third structure that contacts a distal end of the second portion and faces at least one end surface of the light guide member,
wherein the unitary structure forms a T-shaped structure that covers an entire edge of the display panel.

2. The display device according to claim 1, further comprising a light source that is disposed to face a first end surface of the light guide member that is perpendicular to the front surface of the display panel.

3. The display device according to claim 2, further comprising a second end surface of the light guide member that faces the first end surface and is a mirror surface.

4. The display device according to claim 3, further comprising a light reflecting layer that covers the second end surface.

5. The display device according to claim 1, wherein the third structure is oriented parallel to the flat portion.

6. The display device according to claim 5, wherein the third structure is fixed to the second portion.

7. The display device according to claim 6, wherein the third structure is positioned between the display panel and the rear support substrate.

8. The display device according to claim 7, further comprising a holding member positioned between the third structure and at least one end surface of the light guide member.

9. The display device according to claim 8, further comprising an adhesive layer adhered to the holding member and positioned between the holding member and the at least one end surface of the light guide member.

10. The display device according to claim 9, further comprising an optical film positioned between the adhesive layer and the at least one end surface of the light guide member.

11. The display device according to claim 8, further comprising an optical film positioned between the holding member and the at least one end surface of the light guide member.

12. The display device according to claim 1, wherein the rear support substrate includes a metal material.

13. The display device according to claim 8, wherein the holding member is provided to run along two end surfaces of the light guide member that are perpendicular to the first end surface.

14. The display device according to claim 1, wherein the display panel is a liquid crystal module.

15. The display device according to claim 1, wherein the light guide member comprises a glass material having a higher rigidity than resin materials and having a lower coefficient of thermal expansion than resin materials.

16. The display device according to claim 1, further comprising a reflection sheet disposed on a back surface of the light guide member.

17. The display device according to claim 1, wherein the third structure is fixed to the second portion.

18. The display device according to claim 17, wherein the third structure is positioned between the display panel and the rear support substrate.

19. The display device according to claim 18, further comprising a holding member positioned between the third structure and at least one end surface of the light guide member.

20. The display device according to claim 19, further comprising an adhesive layer adhered to the holding member and positioned between the holding member and the at least one end surface of the light guide member.

* * * * *